(12) United States Patent
Kildevaeld

(10) Patent No.: US 7,876,458 B2
(45) Date of Patent: Jan. 25, 2011

(54) HIGHLIGHTING GAPS IN A SURFACE

(76) Inventor: Michael Rogler Kildevaeld, 81 Country Club Dr., Yarmouthport, MA (US) 02675

( * ) Notice: Subject to any disclaimer, the term of this patent is extended or adjusted under 35 U.S.C. 154(b) by 533 days.

(21) Appl. No.: 12/024,456

(22) Filed: Feb. 1, 2008

(65) Prior Publication Data

US 2008/0186507 A1 Aug. 7, 2008

Related U.S. Application Data

(60) Provisional application No. 60/898,787, filed on Feb. 1, 2007.

(51) Int. Cl.
*G01B 11/14* (2006.01)
(52) U.S. Cl. ............................................. 356/625
(58) Field of Classification Search ............... None
See application file for complete search history.

(56) References Cited

U.S. PATENT DOCUMENTS 7,083,245 B2    8/2006  Yamamoto
7,122,800 B2   10/2006  Barry et al.
2008/0186515 A1*  8/2008  Henrikson ............ 356/634

FOREIGN PATENT DOCUMENTS

| JP | 07-218756 | 8/1995 |
| JP | 2000-161936 | 6/2000 |
| WO | WO-2008095158 A1 | 8/2005 |

OTHER PUBLICATIONS

Intl Searching Authority, "International Search Report", For US Patent Application No. PCT/US2008/052773, mailed on Jul. 2, 2008.

* cited by examiner

*Primary Examiner*—Gregory J Toatley
*Assistant Examiner*—Juan D Valentin
(74) *Attorney, Agent, or Firm*—Strategic Patents, P.C.

(57) ABSTRACT

A surface gap detector facilitates determining conformance of a surface of an object by providing a light source integrated into the detector that diffusely illuminates the surface of the object so that a user may observe the light that passes between the detector and the object when the surface of the object is aligned in substantial contact with a gap detecting edge of the surface gap detector.

20 Claims, 6 Drawing Sheets

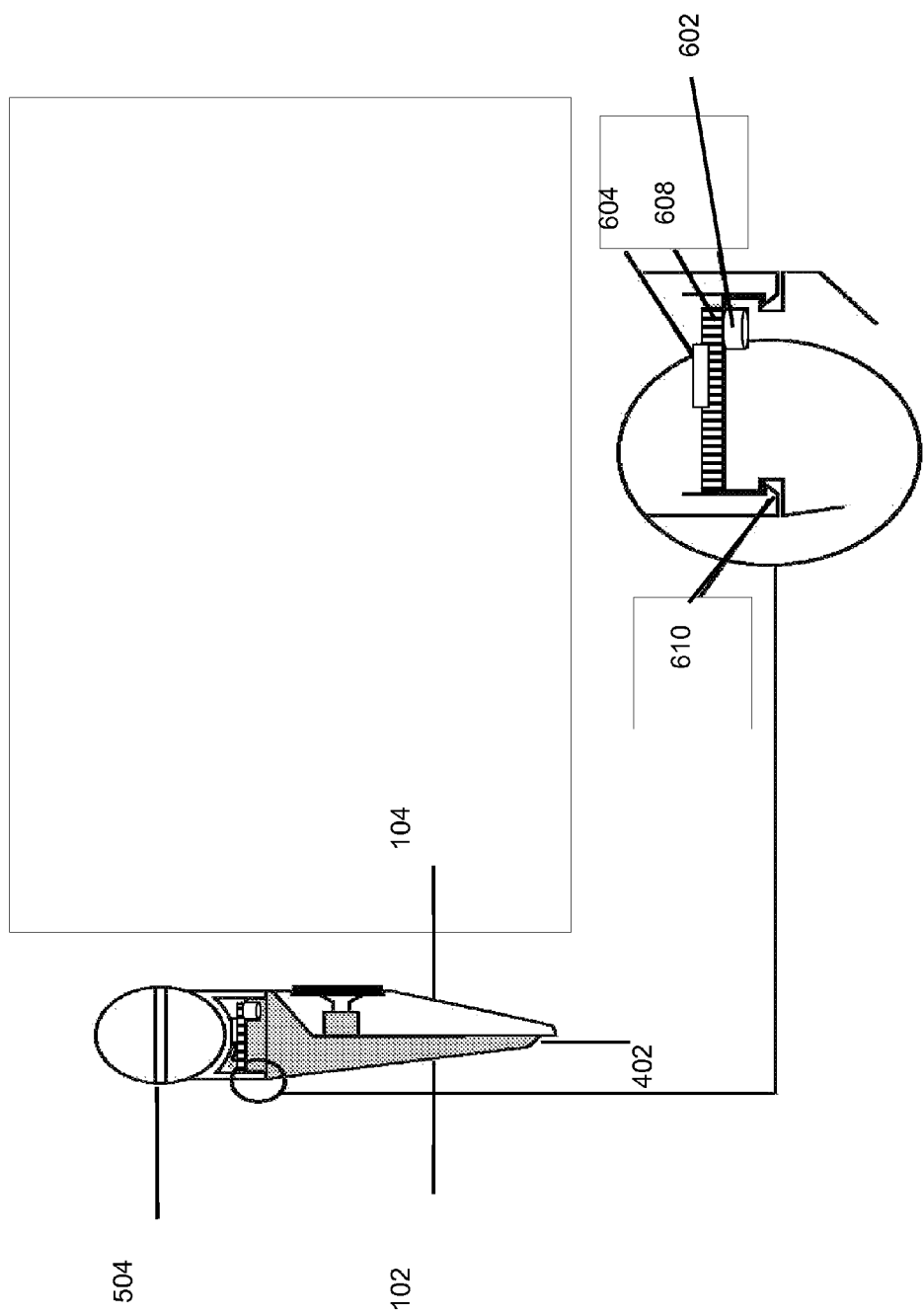

HIGHLIGHTING GAPS IN A SURFACE

CROSS-REFERENCE TO RELATED APPLICATIONS

This application claims the benefit of the following provisional application, which is hereby incorporated by reference in its entirety: U.S. Provisional Application No. 60/898,787, filed Feb. 1, 2007.

BACKGROUND

1. Field

The apparatuses and methods described herein relate to using diffuse light to facilitate detecting conformance of a surface to a requirement, such as a flatness of a surface.

2. Description of the Related Art

Equipment and techniques for determining flatness of a surface vary, but manual methods typically include using a trubar, a precision made cylindrical steel bar. However, a trubar is cumbersome to use in most applications. The trubar is simply a very accurate flat reference that can be placed against another surface when checking the other surface for flatness. To use a trubar, such as to check flatness of a snow ski, a user must position the surface of the ski to be checked substantially in a plane of the user's line of sight while placing the trubar on the surface and then moving the ski around to look for small amounts of ambient light passing through any gaps between the trubar and the surface. Detecting more than a small amount of the surface requires repositioning the ski in the line of sight before repeating the above procedure.

One exemplary drawback of this process is that without good lighting, it is difficult to detect critical variations in the surface being checked. Given the need to often reposition the object in the user's line of sight and reposition the trubar on the surface being checked, gaining good lighting becomes an additional step after each adjustment.

SUMMARY

Provided herein are apparatuses and methods for determining the flatness or non-flatness of an object. A method and apparatus for determining the flatness or non-flatness of an object may comprise providing an illuminated light dispersing elongated member with at least one substantially flat surface. In addition, the flat surface may project light, where a gap between an object placed against the flat surface and the flat surface may be highlighted by the projected light. In the method and apparatus, the apparatus may be a true bar. In some embodiments, the light source is an LED light.

These and other apparatuses, systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 6 depicts an exploded view of the assembly the surface gap detector of FIG. 4.

DETAILED DESCRIPTION

Figure 1:
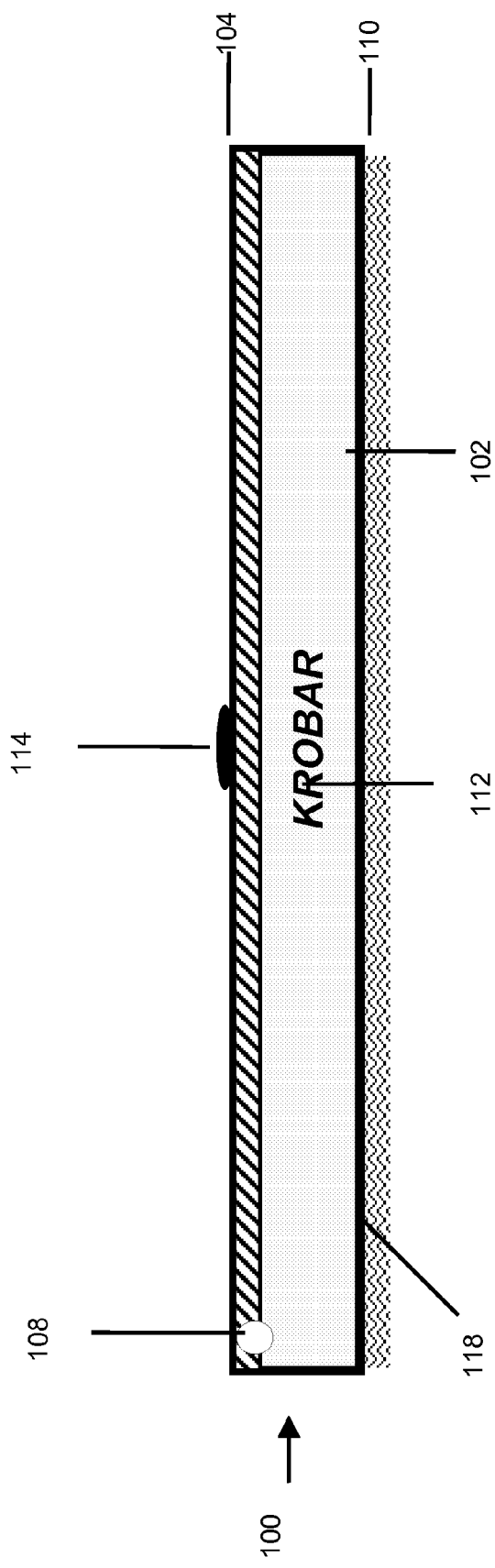
FIG. 1 depicts a side view of a self illuminated embodiment of the surface gap detector.

A surface gap detector may facilitate detecting gaps, unwanted variations, or non-uniform surfaces by projecting light uniformly along the surface behind a flat edge placed against the surface. The surface gap detector may comprise a light source illuminating an elongated light dispersing material to generate the uniformly projected light. The surface gap detector and the surface to be checked do not need to be held so that ambient or other task lighting may pass between them because the light may be provided by the surface gap detector. The surface gap detector may produce colored light, such as, but not limited to, red light to better present a gap in the surface to the user. The surface gap detector may facilitate easily detecting features, gaps, surface irregularities, deviations, and the like that are less than one-sixteenth of an inch in size. The surface gap detector may present uniform light that is equally dispersed along the surface being checked so as not to flood portions of the surface of object in question, resulting in false gap detection or missed gap detection.

The invention can be used in a variety of industries and applications to determine either flatness, or the conformance of an item to a predetermined shape, such as a particular curvature. For example, the invention may be used in the skiing and snowboarding industry in determining whether skis, snowboards or their edges are flat. The invention may be used in the racing industry to determine whether an engine part is flat. In manufacturing, the invention may be used to determine whether a press tool or a manufactured part is flat or conforms to a certain shape. In a CNC machine shop, the invention may be used to determine whether a stamped or folded part is flat. Wood workers and wood finishers may use the invention to determine whether table tops or chair backs have flat surfaces. For sports with skates or edges, such as figure skating, ice hockey and bobsledding, the invention may be used to test the skates and edges. A curved version of the surface gap detector may be used in making bobsleds to test the surface of the bobsled blade. The above is for example only, and is not meant as an exhaustive list of uses.

This surface gap detector may provide benefits in the area of qualitatively determining the quality of certain surfaces. By including a light source in the surface gap detector, determining whether an object is flat may be easier, faster, less costly, more accurately accomplished, less stressful to the user, and the like. The light source may make it easier to determine flatness in working conditions where there is not enough light to properly determine a gap in a surface. For example, in the ski industry, without the surface gap detector herein disclosed, users may have to hold a ski in one hand with one end pressed against the user's cheek, and hold a trubar in the other hand. The user may then have to hold the ski and trubar up to a light source in order to determine if there are any spaces between the ski and the trubar. A self illuminating surface gap detector may allow the user to leave the ski on a bench, table or other work space and observe light reflecting off of the ski through gaps in the surface. The self illuminating surface gap detector may also make it safer to work on certain objects because, as in the ski example, the user may have both hands free to handle the surface gap detector. A self illuminated surface gap detector that may project colored light on the surface being checked may also allow the user to more quickly check surface flatness (for example) by providing a source of light that may be brighter and may be a different color than ambient light, and by allowing the user to use both hands in handling the surface gap detector.

The light source in the surface gap detector may also provide private label branding opportunities for the supplier of the surface gap detector. In an example the light source may generate a certain color to match the private label brand. The apparatus may also be manufactured in various sizes and shapes, depending on the intended use or target industry.

Referring to FIG. 1 a side view of a self illuminated embodiment of the surface gap detector, the surface gap detector 100 may comprise an elongated light dispersing member having a substantially flat surface 102 for projecting the dispersed light to facilitate determining the flatness of an object that is placed against a gap detecting edge 118 of the surface gap detector 100. In one embodiment, the surface gap detector 100 comprises a gap detecting edge 118 that is shaped like a straight edge. In some embodiments, the length of the apparatus is twelve (12) inches.

In another embodiment, a surface gap detector 100 may comprise a light source illuminating an elongated light dispersing material 102, where the light dispersing material 102 has at least one substantially flat surface for projecting the dispersed light. In addition, the surface gap detector 100 further may comprise a structural support plate 104 that supports the light source, the light dispersing material 102, and communicates with the gap detecting edge 118. In embodiments, the gap detecting edge 118 may be a lower extended edge of the support plate 104.

In one embodiment, the structural support plate 104 is made of metal, such as steel, tin, aluminum, magnesium, titanium, or composite metal material. The metal body may be formed through any number of processes, including, but not limited to stamping, extruding, forming, and machining. In some embodiments, the support plate 104 may include a mechanism for facilitating storage of the surface gap detector 100. In certain embodiments, the mechanism for storing may be a hook-hole 108 for hanging the surface gap detector 100 on a hook, peg, nail, and the like.

In other embodiments, the elongated light dispersing material 102 produces substantially uniform dispersed light 110. In certain embodiments, the elongated light dispersing material 102 may be one or more of an acrylic material, a polyurethane material, a polystyrene material, a polycarbonate material, glass, fiber optics, Plexiglas, or some other light dispersing material. In another embodiment, the elongated light dispersing material 102 may have a beveled edge to facilitate allowing the user to keep the substantially flat surface of the surface gap detector 100 on an object placed against the surface gap detector 100 as the user moves the surface gap detector 100 along a surface of the object. A beveled edge may also facilitate allowing the user to keep the substantially flat surface of the surface gap detector 100 on an object placed against the surface gap detector 100 as the user moves the object along a substantially flat surface of the surface gap detector 100. In some embodiments, the elongated light dispersing material 102 may be screwed into the support plate 104, but not in a way that restricts or impacts the diffusion of light. In other embodiments, the assembly of the apparatus may be accomplished by one or more of snapping the pieces together; bonding the pieces using one or more of glue, heat stake, or ultrasonic bonding; screwing the pieces together; forming the support plate 104 around the elongated light dispersing material 102; or some other process.

In one embodiment, the surface gap detector 100 does not include an elongated light dispersing material as herein described. In embodiments, such as embodiments without the light dispersing material, the surface gap detector 100 may include a gap detecting edge 118 as herein described that may be an extended edge of the support plate 104. In some embodiments, the substantially uniform dispersed light 110 may be diffused by a small slit in a diffusing slit plate disposed between the light source and the gap detecting edge 118. In embodiments, the light may not be directly emitted through the slit and, instead, may shine away from the diffusing slit plate and at a reflective surface that reflects the light toward the diffusing slit plate.

In some embodiments, the apparatus includes a switch 114 for activating the light source. In some embodiments, the elongated light dispersing material 102 may include a brand 112. In some other embodiments, the brand 112 may be a company logo, a trade name, a trademark, an image, or some other type of branding. The brand 112 may be placed in or on the elongated light dispersing material 102 by a process, including, but not limited etching, burning, printing, pressing, scratching, painting or some other process.

Figure 2:
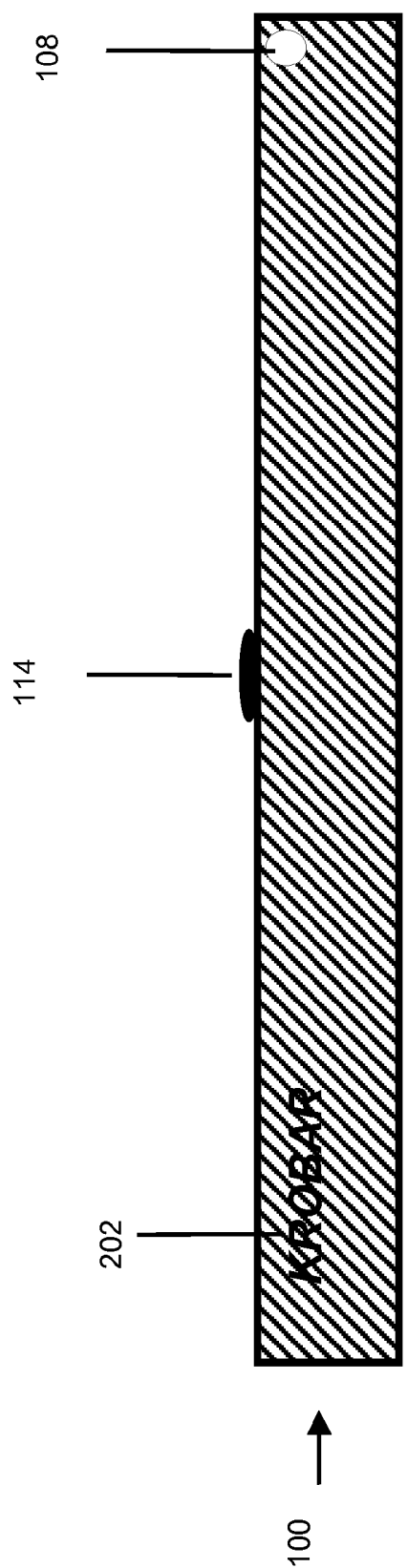
FIG. 2 depicts a plan-view of a side of the surface gap detector that is opposite that depicted in FIG. 1.

Referring now to FIG. 2, a plan-view of a side of the surface gap detector that is opposite that depicted in FIG. 1, in one embodiment, the surface gap detector 100 may include a brand 202 on the support plate 104. In some embodiments, the brand 202 may be a company logo, a trade name, a trademark, an image, or some other type of branding. The brand 202 may be placed in or on the support plate 104 by a process, including, but not limited etching, burning, printing, pressing, scrawling, painting or some other process.

Figure 3:
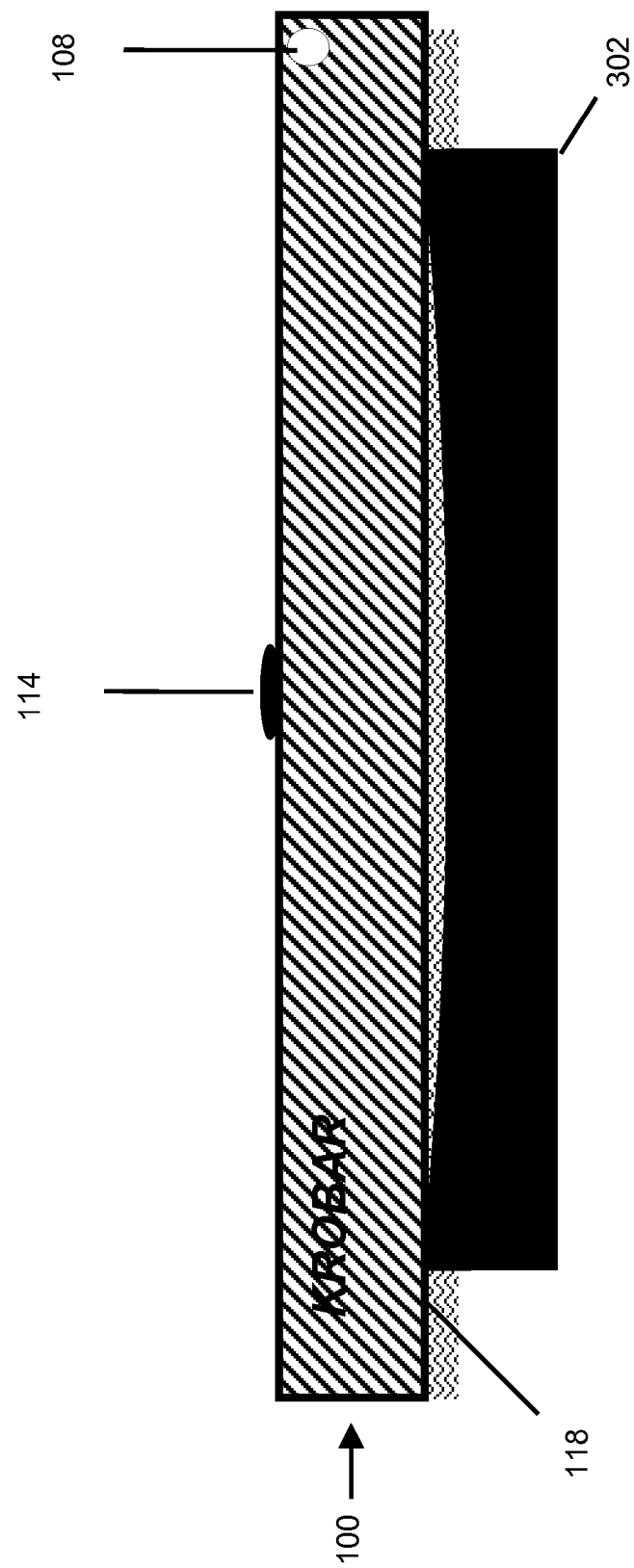
FIG. 3 depicts the surface gap detector placed upon a concave object.

Referring now to FIG. 3, depicting the surface gap detector placed upon a concave object, the flatness of a surface of an object 302 that is placed against a gap detecting edge 118 of the surface gap detector can be determined by observing the amount of light that reflects off of the object surface and is visible in an open space (e.g. a gap) between the object surface and the gap detecting surface 118.

Figure 4:
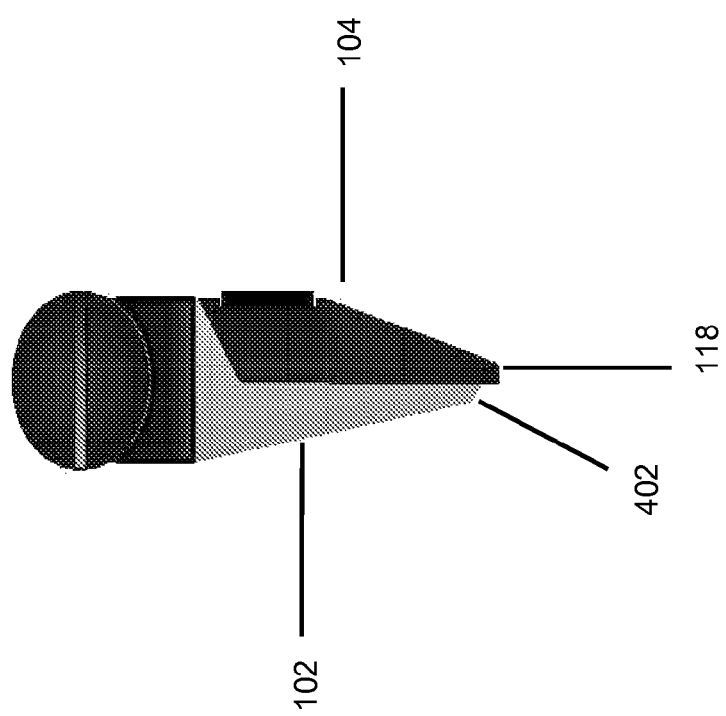
FIG. 4 depicts an end-view of the surface gap detector.

Referring to FIG. 4, an end-view of the surface gap detector, a narrow projecting edge may be used as the gap detecting edge 118. The gap detecting edge 118 may be a terminal end of the support bracket 104 and may extend slightly below the light emitting surface 102 of the light dispersing member. Alternatively, the gap detecting edge 118 may be an adapted light emitting surface 402 that facilitates gap detecting. In this embodiment, the light diffusing member may have opaque near and far sides with only the emitting surface 402 being translucent to allow light to emit from this surface.

To facilitate using the gap detecting edge 118 or the adapted emitting surface 402 as the end that is placed against the surface to be checked, the gap detecting edge 118 and/or the adapted emitting surface 402 may be angled, curved, may include a near side rounded corner and a far side sharp corner, and the like. In some other embodiments, the narrow projecting edge 118 or 402 may have a rounded far corner and a sharp near corner as described herein, where the rounded far corner may help prevent the seepage of dispersed light and the sharp near corner may help maintain the substantially flat surface. By creating what may essentially be similar to a knife edge along the sharp near corner, the relative angle of tilt between the surface being checked and the surface gap detector 100 can be substantially widened. This facilitates keeping the surface gap detector 100 in contact with the surface to be checked, without requiring a ninety-degree angle between the surface gap detector 100 and the surface to be checked. This improves ease and quickness of use.

Figure 5:
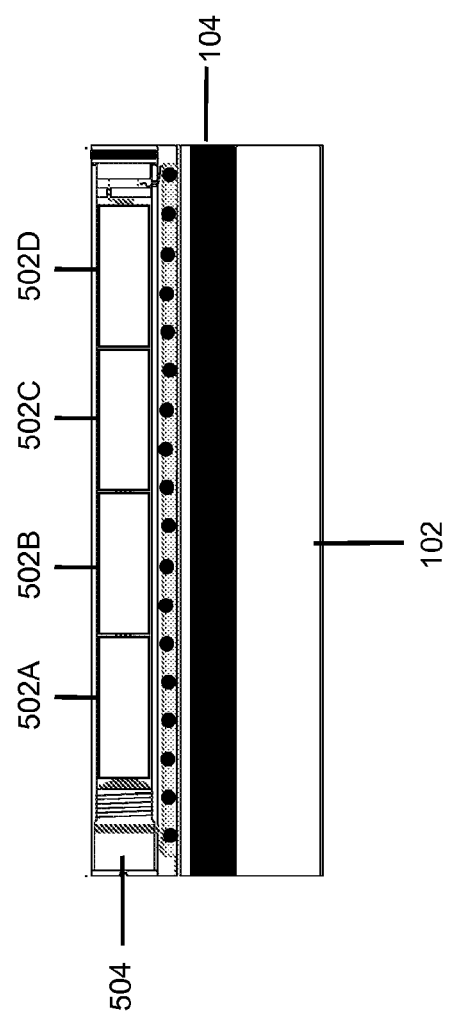
FIG. 5 depicts an exploded view of an exemplary embodiment of a power source for the surface gap detector light.

Referring to FIG. 5, an exploded view of an exemplary embodiment of a power source for the surface gap detector light, the surface gap detector 100 may include a power source. In one embodiment, the power source may comprise one or more batteries 502A-502D. In some embodiments, the housing for the power source 504 may comprise a tube for holding batteries. The power source housing 504 may also be used as a handle or anchor for a portion of the users' palm.

Referring now to FIG. 6, an exploded view of the assembly the surface gap detector of FIG. 4, the light producing element 602 is an LED. In an embodiment, there may be twenty-three LEDs, where the apparatus is twelve (12) inches. As used herein for purposes of the present disclosure, the term "LED" should be understood to include any light emitting diode or other type of carrier injection/junction-based system that is capable of generating radiation in response to an electric signal. Thus, the term LED includes, but is not limited to, various semiconductor-based structures that emit light in response to current, light emitting polymers, light-emitting strips, electro-luminescent strips, and the like.

In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured to generate radiation having various bandwidths for a given spectrum (e.g., narrow bandwidth, broad bandwidth).

For example, one implementation of an LED configured to generate essentially white light (e.g., a white LED) may include a number of dies which respectively emit different spectrums of luminescence that, in combination, mix to form essentially white light. In another implementation, a white light LED may be associated with a phosphor material that converts luminescence having a first spectrum to a different second spectrum. In one example of this implementation, luminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectrums of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources as defined above, incandescent sources (e.g., filament lamps, halogen lamps), fluorescent sources, phosphorescent sources, high-intensity discharge sources (e.g., sodium vapor, mercury vapor, and metal halide lamps), lasers, other types of luminescent sources, electro-luminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, tribo luminescent sources, sonoluminescent sources, radioluminescent sources, and luminescent polymers. In some embodiments, the light producing element 602 is recessed in the support plate 104, where the recess may form an inverted "L".

In another embodiment, the elongated light dispersing material 102 may be locked into the structural support plate 104 by a locking assembly 610. In other embodiments, light producing elements 602 can snap into the dispersing material 102. In some other embodiments, light producing elements 602 may be snapped into a "bulkhead" opening in the support plate 104. In some embodiments, the light source is connected to a power supply 502 by one or more PCB boards 608 and resistors 604. In another embodiment, some or all of the power supply 502, the switch 114, and the light producing elements 602 may be wired together. In yet another embodiment, the some or all of the power supply 502, the switch 114, and the light producing elements 602 may be assembled to a printed circuit board 608.

In an alternative embodiment, the surface gap detector 100 may be shaped to fit a specific pre-determined angle or curve. For example, the apparatus may be shaped to determine that objects placed against the apparatus's gap detection edge 118 make a right angle. In addition, the surface gap detector 100 may be manufactured to determine whether certain curved objects, for example, bells, placed against the gap detecting edge 118 of the surface gap detector 100 without gaps. In other embodiments, the surface gap detector 100 may be used to detect the lack of certain required features in a surface. For example, the surface gap detector 100 may be used to detect if the surface has an incomplete saw tooth pattern.

In another embodiment, the invention may be used in conjunction with a photo detecting device, where the photo detecting device may be used to automate the detection of object surfaces that do not conform to a shape represented by the gap detecting edge 118 of the surface gap detector 100. For example, the photo detecting device may be used to check skis after a grinding process. In this example, the skis may be placed against the surface gap detector 100 and any light that illuminates gaps in the surface may be detected by the photo detector. If the photo detecting device detects light over a certain threshold, it could determine that the ski is not flat and must go through the grinding process again.

In other alternative embodiments, the apparatus may include other features. In one embodiment, the surface gap detector 100 may include distance markings similar to the markings on a ruler. The distance markings may be used for a variety of purposes, including, but not limited to measuring distances on an object or determining a location of a detected defect or gap in the surface of an object. In certain embodiments, the distance markings may be etched into a surface of the surface gap detector 100. In another embodiment, the distance markings may be painted onto a surface of the surface gap detector 100. In still another embodiment, the distance markings may be on another object, such as a tape that is attached to the surface gap detector 100 by for example. In another embodiment, the surface gap detector 100 may include one or more bubble levels that may be used to determine whether the detector 100 is horizontal.

In another alternate embodiment, the light diffusing member 102 may be shaped so that the light source, such as a bank of LEDs may be projecting light into a top edge of the member, but offset horizontally from the light emitting edge. By being offset, the LEDs would direct most of their light toward a reflective surface of the light diffusing member that would reflect the light into the diffusing member so that the light eventually projected from a projecting surface of the light diffusing member 102, without the LEDS causing a non-uniform projection of light.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. An apparatus comprising:
    a light source; and
    an elongated plate including a gap detecting edge, the light source supported by the plate and disposed to diffusely illuminate the gap detecting edge to highlight gaps in a surface brought in contact with the gap detecting edge.

2. The apparatus of claim 1, wherein the light source comprises one or more light emitting diodes.

3. The apparatus of claim 1, wherein the light source comprises one or more light bulbs.

4. The apparatus of claim 1, wherein the light source produces a colored light.

5. The apparatus of claim 1, further comprising an elongated light dispersing panel displaced between the light source and the gap detecting edge.

6. The apparatus of claim 5, wherein the elongated light dispersing panel produces substantially uniform dispersed light.

7. The apparatus of claim 5, wherein the elongated light dispersing panel comprises an acrylic material.

8. The apparatus of claim 1, further comprising a switch for activating the light source.

9. The apparatus of claim 1, further comprising a power source for providing power to the light source.

10. The apparatus of claim 9, wherein the power source comprises one or more batteries.

11. The apparatus of claim 9, wherein the power source is housed in a recessed portion of the elongated plate.

12. The apparatus of claim 1, wherein the elongated plate comprises a hole for hanging the apparatus.

13. The apparatus of claim 1, wherein the elongated plate is adapted to include ruler markings.

14. The apparatus of claim 1, further comprising a bubble level disposed in the elongated plate, wherein the bubble level indicates a tilt of the gap detecting edge relative to horizontal.

15. A method for illuminating a gap detecting edge of a surface gap detecting device, comprising:
    illuminating a top edge of a horizontally elongated translucent plate;
    diffusing the light in the translucent plate, where the light is substantially uniformly dispersed;
    emitting the dispersed light out of a bottom edge of the translucent plate; and
    positioning the translucent plate along side a horizontally elongated opaque plate, wherein the bottom of the opaque plate comprises the gap detecting edge and the bottom edge of the translucent plate is substantially parallel to the gap detecting edge, so that the emitted light diffusely illuminates an object placed in close proximity to the gap detecting edge.

16. The method of claim 15, further comprising the emitted light highlighting a gap in a surface of the object placed in close proximity to the gap detecting edge.

17. A method for highlighting gaps in a surface, comprising:
    providing a surface gap detector;
    providing a surface of an object to be checked for gaps;
    aligning a gap detecting edge of the surface gap detector with the surface of the object;
    illuminating the surface of the object on a far side of the surface gap detector; and
    reflecting the illumination off of the surface of the object so that light reflected through a gap formed between the surface of the object and the gap detecting edge can be observed from a near side of the surface gap detector.

18. The method of claim 17, further comprising providing a light emitting diode for illuminating the surface of the object.

19. The method of claim 17, further comprising providing a light bulb for illuminating the surface of the object.

20. The method of claim 17, wherein illuminating the surface of the object comprises projecting substantially uniform dispersed light toward the surface of the object.

* * * * *